United States Patent [19]

Bendayan et al.

[11] 4,389,087
[45] Jun. 21, 1983

[54] MECHANICAL PROTECTION AND REINFORCEMENT FOR OPTICAL FIBERS

[75] Inventors: Jacques Bendayan; Robert Jocteur, both of Lyons, France

[73] Assignee: Les Cables de Lyon S.A., Lyons, France

[21] Appl. No.: 77,496

[22] Filed: Sep. 21, 1979

Related U.S. Application Data

[63] Continuation of Ser. No. 876,831, Feb. 10, 1978, abandoned, which is a continuation-in-part of Ser. No. 718,200, Aug. 26, 1976, abandoned.

[30] Foreign Application Priority Data

Sep. 19, 1975 [FR] France .............................. 75 28808

[51] Int. Cl.³ .............................................. G02B 5/14
[52] U.S. Cl. .................................................. 350/96.23
[58] Field of Search ............... 350/96.23; 174/110 R, 174/110 DM, 110 N, 110 SR, 110 AR, 110 FC, 117 R

[56] References Cited

U.S. PATENT DOCUMENTS

| | | | |
|---|---|---|---|
| 3,573,348 | 4/1971 | Herrmann | 174/110 R |
| 4,000,936 | 1/1977 | Gloge | 350/96.23 |
| 4,100,008 | 7/1978 | Claypoole | 350/96.23 |

OTHER PUBLICATIONS

R. A. Miller, "Tactical Low Loss Optical Fiber Cable For Army Appl.", *Proceedings International Wire and Cable Symposium,* Dec. 1974.
"Communications Optical Links Made Simpler", in *Electronics,* Jun., 1976, pp. 163–164.

*Primary Examiner*—John D. Lee
*Assistant Examiner*—Frank González
*Attorney, Agent, or Firm*—Sughrue, Mion, Zinn, Macpeak and Seas

[57] ABSTRACT

The present invention relates to the preparation of an optical fiber in a form suitable for use in the manufacturing of a telecommunications cable having one or several fibers. The fiber is reinforced by a longitudinally disposed support element intended to bear at least a part of any traction forces which would otherwise be borne by the fiber.

3 Claims, 2 Drawing Figures

MECHANICAL PROTECTION AND REINFORCEMENT FOR OPTICAL FIBERS

BACKGROUND OF THE INVENTION

This is a continuation of application Ser. No. 876,831 filed Feb. 10, 1978, now abandoned, which application is a continuation-in-part of the parent application Ser. No. 718,200, filed Aug. 26, 1976, now abandoned.

The present invention relates to the preparation of optical fibers in a form suitable for making a telecommunications cable having one or several optical fibers.

A mechanical covering is provided to reduce damage from at least some of the following hazards:

Abrasion which can cause microfractures in the surface material of the optical fiber (whether the rubbing is accidental or deliberate) making the fiber mechanically fragile and altering its transmission characteristics;

Corrosion which can likewise cause microfractures having the same undesirable effects as when caused by abrasion; and Mechanical stress, both longitudinal and transversal, which can result in microcurving and microbreaking of the fiber during cable manufacture altering both the mechanical and the transmission performance of the fiber.

To improve the resistance of an optical fiber which undergoes a winding under tension when it passes through the machines used for manufacturing a cable, it is already a theoretically known practice to strengthen it by means of two extruded concentric coverings. It is, however, advantageous, to form the inner covering from a material having a high modulus of elasticity so that its great mechanical rigidity resists microcurves (which are small lateral deformations of the optical fiber) whose consequences are detrimental to the transmission characteristics of the fiber. The outer covering is preferably made of a material having a low modulus of elasticity. It fulfills the function of a damping buffer and absorbs small lateral deformations which are liable to be applied to the optical fiber.

The two concentric coverings substantially improve the resistance to the optical fiber to longitudinal and transversal stresses, but are not always sufficient in themselves to prevent traction forces from being exerted on the fiber during cable manufacturing operations and the detrimental consequences which these forces can have on the performance of the fiber.

Preferred embodiments of the present invention provide an improved reinforcement of an optical fiber in order to avoid this disadvantage.

SUMMARY OF THE INVENTION

The present invention provides: an optical fiber having an inner covering coming in contact with the optical fiber and an outer covering concentric with the inner covering wherein the fiber is reinforced by at least one supporting element for withstanding at least a part of any traction force applied to the covered fiber. This supporting element is disposed longitudinally between the two concentric coverings which surround the optical fiber.

BRIEF DESCRIPTION OF THE DRAWINGS

Two embodiments of the present invention are described by way of example with reference to the accompanying drawing in which.

DESCRIPTION OF THE PREFERRED EMBODIMENTS

Figure 1:
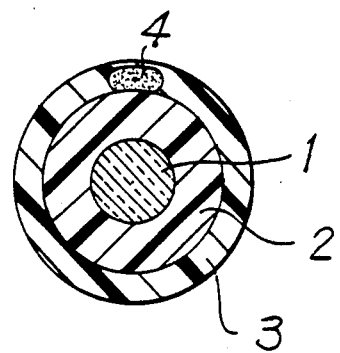
FIGS. 1 and 2 are respective cross sections of two reinforcement structures for an optical fiber according to the invention.

FIG. 1 shows a cross-section of an optical fiber 1, covered by a protection formed by two concentric coverings 2 and 3 and by cord 4.

The inner covering 2 coming into contact with the fiber 1 is formed by extrusion of a material having a high modulus of elasticity such as a polyamide, a polyethylene terephthalate or a high density polyethylene. By its rigidity, it reinforces the resistances of the optical fiber to lateral deformations and hence reduces the additional transmission losses due to microcurves. The outer covering 3, also produced by extrusion, is made of a material having a low modulus of elasticity and having a lower melting point than the material of the inner covering 2. Suitable materials include a low-density polyethylene, a reflexible vinyl polychloride or an ethylene and vinyl acetate copolymer. Due to its great lateral compressibility, this outer covering 3 fulfills the function of a damping buffer which prevents lateral pressures from being transmitted to the optical fiber 1. A mechanical supporting element constituted by a cord 4 is disposed along the optical fiber 1 between the inner covering 2 and the outer covering 3, after extrusion of the inner covering 2 and at the same time as the extrusion of the outer covering 3. This supporting element must be kept properly taut, which entails its positioning between the inner and outer coverings 2 and 3 and excludes the forming of one or both of these coverings by means of plastic tapes or self-adhesive elements. The supporting element 4 is intended to withstand a very great part of the traction forces exerted on the protected fiber, in particular when the fiber passes through a cabling machine and also when the cable thus manufactured is laid.

The supporting element 4 is produced in the form of a cord of material which resists the traction well, having a high modulus of elasticity and hence little extension under stress. Suitable materials include aromatic polyamide hairs, glass fibers or carbon fibers coated with a binding product which keeps them together. Metallic materials (29 e.g. steel wire) are also suitable when immunity against electromagnetic influences is not required.

Figure 2:
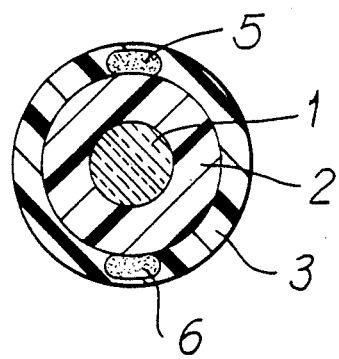

FIG. 2 shows a cross-section of a variation of the reinforcement of an optical fiber as shown in FIG. 1 in which the supporting element is formed by two cords 5 and 6 which are disposed diametrically opposite each other in relation to the optical fiber 1 and lie between the inner covering 2 and the outer covering 3. It is evident that the supporting element could be made of a greater number of cords regularly spaced out round the optical fiber 1, each cord possibly being reduced itself to a single strand.

It should be observed that the diameter of the optical fiber provided with its reinforcement can remain relatively small, in the order of a millimeter, for example, the diameter of the bare fiber being of the order of a hundred or so microns. This makes it possible to gather together a large number of covered optical fibers to form a telecommunications cable without the bulk thereof becoming prohibitive.

In accordance with the present invention, the optical fiber transmits only light, and the outer and inner covering provide mechanical protection for the optical fiber. The outer and inner coverings are optically inactive relative to the optical fiber. The position of the supporting element at the border of the outer covering and the inner covering provides a predetermined optimum combination of mechanical protection and optical transmission.

In summary, the reinforcement arrangement for an optical fiber, according to the present invention, provides for an inner covering in contact with the optical fiber. An outer covering is arranged concentric with the inner covering. One or more supporting elements are provided for withstanding at least part of a traction force which may be applied to the covered fiber. The supporting element is arranged longitudinally between the two concentric coverings surrounding the optical fiber, and the supporting element reinforces the optical fiber, while being positioned between the two concentric coverings at the border of the outer covering and the inner covering. The supporting element inhibits shrinkage of the outer and inner coverings by maintaining substantially the longitudinal stiffness of the coverings. The optical fiber transmits light only, whereas the outer and inner coverings provide mechanical protection for the optical fiber while being optically inactive relative to the optical fiber. The supporting element, positioned at the border of the outer and inner coverings, provides a predetermined optimum combination of mechanical strength and protection, as well as optical transmission.

In accordance with the present invention, furthermore, the supporting element may be in the form of a longitudinal bar-shaped member which has one face that coincides substantially with a portion of the border line between the inner covering and the outer covering. The side of the bar-shaped member, which lies opposite to the face coinciding with the border line, is within the outer covering and is spaced from the periphery thereof. The edges of the bar-shaped member are substantially rounded. The inner covering may be fabricated from an extrudable material which has a high modulus of elasticity, whereas the outer covering may be fabricated from an extrudable material which has a low modulus of elasticity. The edges of the bar-shaped member subtend a substantially acute central angle from the axis of the optical fiber, and these edges lie substantially along radii from the axis of the optical fiber.

From the viewpoint of mechanical reinforcement, it may be better to set the supporting element close to the center in order to reduce the twisting and micro curves of the optical fiber. However, from the optical viewpoint, it is better to remove the supporting element further of the center of the optical fiber. The border line arrangement is a compromise between these essential conditions. The optical reason is based on the condition that when an optical fiber is curved, light enters the first outer jacket even if theoretically it must not. This phenomena is due to "leaky modes". Light interferes with the supporting element when the latter is embedded in the first outer jacket.

Accordingly, the two outer jackets are used as a mechanical protection. The optical fiber 1 in the present invention is sufficient for transmitting light, and light theoretically does not enter the outer jacket.

We claim:

1. A reinforced optical fiber comprising: a bare optical fiber; an inner protective covering of an extrudable material of a high modulus of elasticity and in contact with said optical fiber over its whole circumference; an outer protective covering of an extrudable material of a low modulus of elasticity and concentric and in contact with said inner covering along a borderline between said inner and outer coverings over most of its circumference; at least one reinforcing supporting longitudinal cord being embedded within said outer covering and in contact with said inner covering along a portion of said borderline between said inner covering and said outer covering, said inner and outer coverings being optically inactive with respect to said optical fiber.

2. A reinforced optical fiber according to claim 1, wherein said reinforcing supporting longitudinal cord comprises a bar-shaped member having one face coinciding substantially with a portion of said borderline between said inner and said outer coverings, the side of said bar-shaped member lying opposite said face coinciding with said borderline being within the outer covering and spaced from the outer periphery thereof, the edges of said bar-shaped member being substantially rounded.

3. A reinforced optical fiber according to claim 2, wherein said edges of said bar-shaped member subtend an acute central angle from an axis of said optical fiber and lie substantially along radii from said axis.

* * * * *